US006619471B1

(12) United States Patent
Downie et al.

(10) Patent No.: US 6,619,471 B1
(45) Date of Patent: Sep. 16, 2003

(54) FURNACE ROLLER

(75) Inventors: Joseph A. Downie, Independence Township, Beaver County, PA (US); Richard O. Drossman, Hopewell Township, Beaver County, PA (US)

(73) Assignee: Surface Engineering Associates, Inc., Aliquippa, PA (US)

(*) Notice: Subject to any disclaimer, the term of this patent is extended or adjusted under 35 U.S.C. 154(b) by 0 days.

(21) Appl. No.: 10/148,293

(22) PCT Filed: Oct. 25, 2000

(86) PCT No.: PCT/US00/41556

§ 371 (c)(1),
(2), (4) Date: May 28, 2002

(87) PCT Pub. No.: WO02/34026

PCT Pub. Date: May 2, 2002

(51) Int. Cl.[7] .......................... B65G 13/02; B65G 13/06
(52) U.S. Cl. .................................. 198/780; 198/781.03
(58) Field of Search ........................... 198/780, 781.03, 198/785; 492/30, 36, 39, 44

(56) References Cited

U.S. PATENT DOCUMENTS 3,470,948 A 10/1969 Korsch
4,226,608 A * 10/1980 McKelvey ................... 65/106
4,363,163 A * 12/1982 McMaster .................... 492/44
4,631,792 A 12/1986 Wesemann et al.
4,683,627 A 8/1987 Reinhold
4,759,788 A * 7/1988 Ward ............................ 65/114
4,810,464 A 3/1989 Szereto et al.
5,230,618 A 7/1993 Briemont et al.
5,332,628 A 7/1994 Drossman
5,338,280 A 8/1994 Morando
5,341,568 A 8/1994 Briemont et al.
5,362,230 A 11/1994 Facco
5,370,530 A 12/1994 Facco
5,421,724 A 6/1995 Facco
5,547,449 A 8/1996 Krayenhagen
5,702,338 A 12/1997 Morando
6,039,681 A 3/2000 Heinz-Michael

* cited by examiner

*Primary Examiner*—Gene O. Crawford
(74) *Attorney, Agent, or Firm*—Webb Ziesenheim Logsdon Orkin & Hanson P.C.

(57) ABSTRACT

A furnace roller for supporting a heated workpiece in a furnace, including a roller body with a roller body outer surface that is rotatable along a roller body longitudinal axis. A tire is attached to the roller body outer surface and is rotatable with the roller body and supports a heated workpiece. The tire is shaped such that a contact interface between a workpiece and the tire continuously shifts in a longitudinal direction, and the tire is helical-shaped. The furnace roller includes at least two helical-shaped tires attached to the roller body in either side of a roller body bisecting centerline. A method for conveying a heated workpiece in the furnace is also disclosed.

20 Claims, 2 Drawing Sheets

FURNACE ROLLER

BACKGROUND OF THE INVENTION

1. Field of the Invention

The present invention relates generally to furnace rollers, and, in particular, to an improved furnace roller for conveying and supporting a heated workpiece.

2. Description of the Prior Art

In the field of strip steel production, furnaces can be roughly classified as being either of the batch or continuous type. Batch furnaces process an entire coil or slab at one time, while continuous furnaces feed the slab or strip through the heating zones on a continuous basis. These types of furnaces are heated tunnels containing internal furnace rollers to transport the heated workpiece, or strip of steel. For furnaces in the 1800°–2200° F. range, cooling is generally required to keep the roll from becoming heat softened, over-oxidized, or subject to adhesive transfers with the conveyed product. For other furnaces that also operate at these higher heats, i.e., shuttle furnaces, water cooling is generally not available, so the rollers in these furnaces are subject to even more heat softening and other wear and tear issues. These failure modes are directly related to the roller temperature, and keeping the roller surface as cool as possible is desirable and increases the life of the roller. However, a cold roller is also a heat sink, and for most applications the resulting heat losses are unacceptable and create undesirable heat gradients. Therefore, a balance is needed between preserving the roller life through cooling, while, at the same time, conserving thermal energy by heating.

Typically, the hollow uncooled rollers use alloy outer shells, which operate at furnace temperatures. The alloy content of these rollers is such that they maintain sufficient strength and oxidation resistance at the required temperature.

A variant of this approach is evident in U.S. Pat. Nos. 5,702,338 and 5,338,280, which disclose the use of protrusions extending from the roller designed to take the brunt of the wear. These protrusions are commonly referred to as "tires" and are axially spaced along the outer surface of the roller. In addition, these tires can be integrally cast with the support tube or added by fabrication. These tires are subject to a concentrated heated workpiece load, so they must be made of an alloy that is able to resist wear. However, due to their construction, the use of these tires increases the risk of damage to the underside of the heated workpiece or stab. Using the spaced, axially-located tires can create what is referred to as "skid marks" on the bottom side of the strip of steel. These skid marks and other irregularities caused by the use of tires give rise to serious quality issues.

Another class of rollers uses ceramic or mineral fiber materials as both the roller insulator and the heated workpiece contact surface. A water-cooled shaft supports the fiber construction. While this type of roller is thermally efficient and reasonably inexpensive, the refractory outer surface lacks wear resistance. This type of roll design is the traditional standard for stainless steel strip annealing furnaces. Again, the wear and tear of the ceramic or mineral fiber materials creates irregularities at the product contact surface. In addition, these ceramic or mineral fiber materials have life cycles that can be measured in weeks, as opposed to the life cycle of months for super alloys.

A third approach for furnace rollers uses a combination of insulation properties and alloy properties. For example, U.S. Pat. Nos. 5,341,568 and 5,230,618 disclose a water-cooled core which supports an array of larger diameter tires made of a suitable alloy. These tires operate at or near furnace temperatures and are responsible for product contact and conveyance. A refractory casing is built to a diameter slightly smaller than the tires, both inboard and outboard of the array. This refractory protects the water-cooled core tube from heat attack and also prevents thermal losses to the water system. Wear of the refractory is reduced because its outer surface is below the plane of contact of the tires. This roller design conserves furnace heat, while, at the same, conveying the product without excessive slab cooling. However, due to the differences in expansion and strength properties between the steel core and the refractory casing, repeated thermal cycles can lead to structural failure of the refractory, de-bonding of the refractory, and oxidative attack of the core tube, which eventually causes failure. Importantly, as discussed above, these tires can wear grooves and skid marks in the bottom surface of the slab, which can make it difficult to guide the slab into the next rolling operation. Further, these irregularities may cause quality and specification problems.

SUMMARY OF THE INVENTION

It is therefore an object of the present invention to provide a furnace roller that overcomes the deficiencies of the prior art. It is another object of the present invention to provide a furnace roller with a contact surface area with adequate strength and oxidation resistance at higher temperatures. It is still another object of the present invention to provide a furnace roller that does not subject the heated workpiece to adhesive transfers and skid marking on the bottom of the steel slab. It is yet another object of the present invention to provide a furnace roller that distributes the oxidative interactions with the entire slab area via a travelling helix, while limiting the amount of alloy material heat transfer at the roller counterface area.

Accordingly, we have invented a furnace roller for supporting a heated workpiece in a furnace. The furnace roller includes a roller body with a roller body outer surface. This roller body is configured to be rotatable along a roller longitudinal axis. The furnace roller also includes a tire or protrusion attached to the roller body outer surface. This tire is rotatable with the roller body and supports the heated workpiece, and the shape of the tire is such that a contact interface between the workpiece and the tire continuously shifts in a longitudinal direction.

The present invention also includes a method of conveying a heated workpiece in a furnace. In a first step, a plurality of substantially cylindrical tubular roller bodies are provided, each roller body having a roller body outer surface and configured to be rotatable along a roller body longitudinal axis. A tire is attached to the roller body outer surface and configured to be rotatable with the roller body, the tire supporting the heated workpiece. Next a flat-heated workpiece (a steel slab) is inserted into a furnace opening. Finally, the flat-heated workpiece is conveyed over the plurality of roller bodies, the tires supporting the heated workpiece during conveyance, such that a contact interface between the workpiece and the tire continuously shifts in a longitudinal direction.

The present invention, both as to its construction and its method of operation, together with additional objects and advantages thereof, will best be understood from the following description from specific embodiments when read in connection with the accompanying drawings.

DETAILED DESCRIPTION OF THE PREFERRED EMBODIMENT

Figure 1:
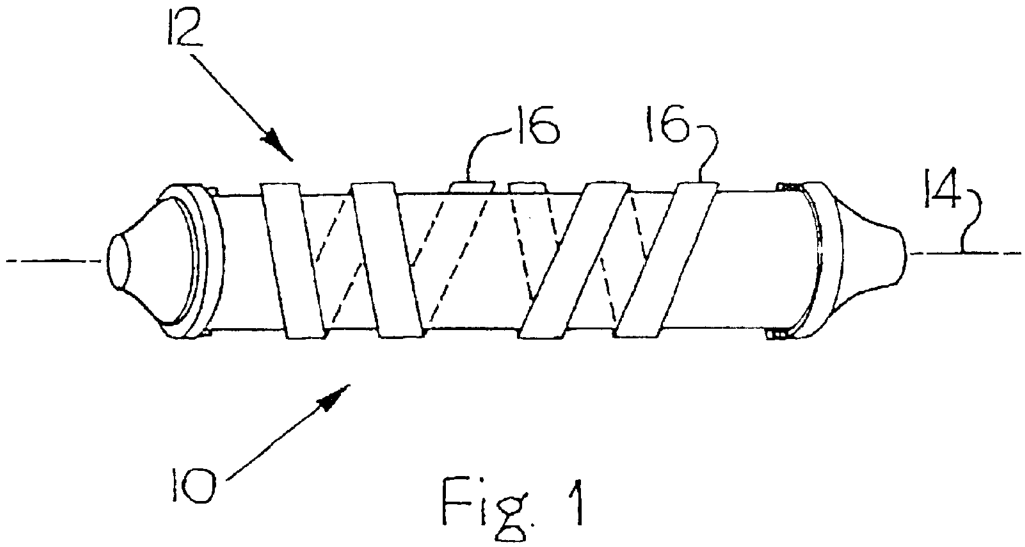
FIG. 1 is a perspective view of a furnace roller according to the present invention.
Figure 2:
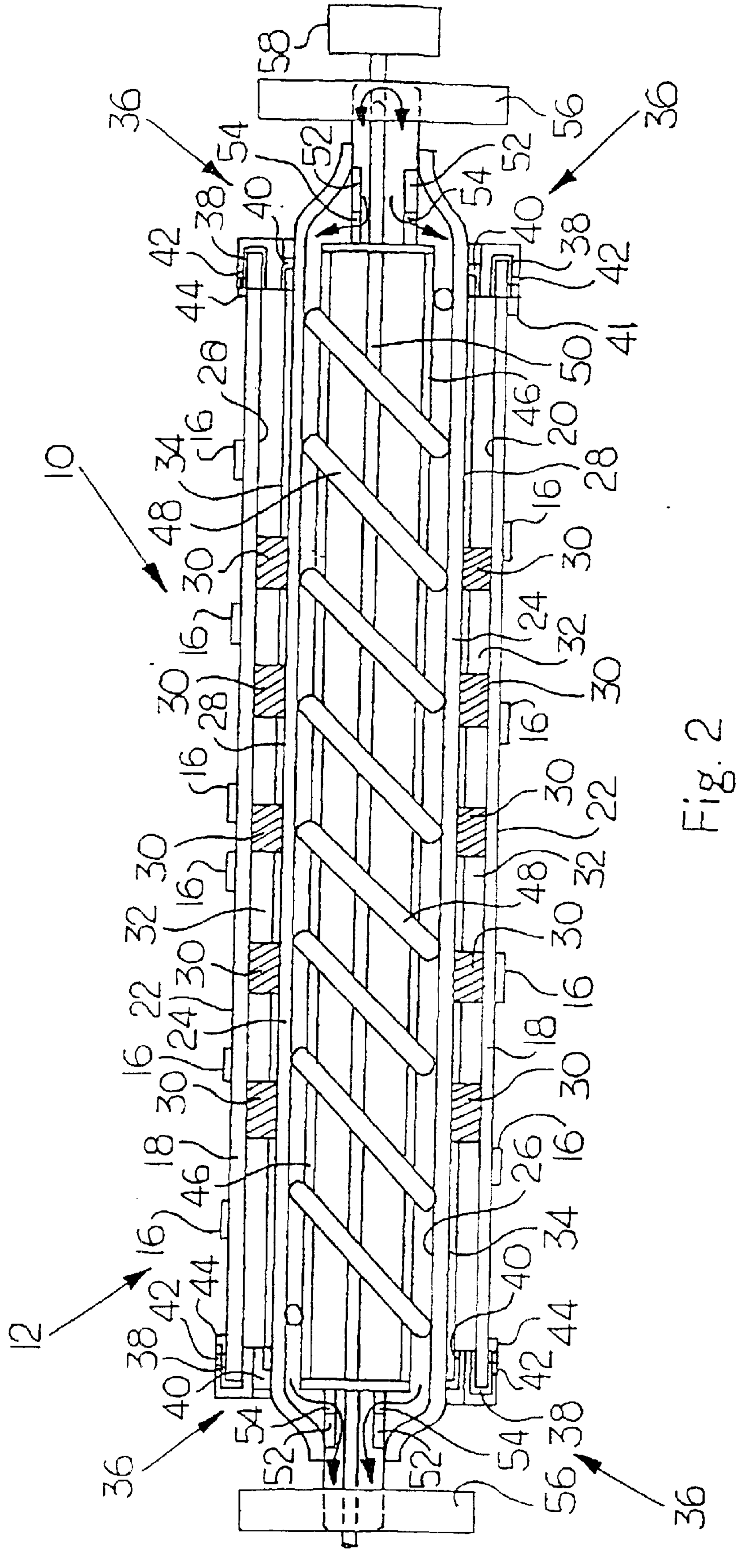
FIG. 2 is a side-sectional view of the furnace roller of FIG. 1.

The preferred embodiment of a furnace roller 10 of the present invention is generally shown in FIGS. 1 and 2. Referring to FIG. 1, the furnace roller 10 includes a substantially cylindrical tubular roller body 12. This tubular roller body 12 is rotatable along a roller body longitudinal axis 14. Attached to the outer surface of the substantially cylindrical tubular roller body 12 is a helical-shaped tire 16. This helical-shaped tire 16 is rotatable with the roller body 12 and supports a heated workpiece, i.e., a steel slab. In a preferred embodiment, two centrally located helical-shaped tires 16 are attached to the outer surface of the tubular roller body 12, providing added support for the heated workpiece. It is this helical pattern of opposite tires 16 on either side of the roller body 12 centerline that tends to center the slab on the roller body 12 surface. It is also this helical-shaped pattern that shifts the contact surface and reduces any chance of slab marking. It is envisioned that the dimensions of the tires 16 can be optimized for different furnace rollers 10 in different furnace applications. It is also envisioned that tires 16 may be situated in various patterns, such that a contact interface between the heated workpiece and the tires 16 continuously shifts in a longitudinal direction. The roller body 12 must only adequately support the tire 16 and need not be cylindrical or tubular.

Both the tubular roller body 12 and the tires 16 may be made of various super alloys, including nickel-based super alloys and cobalt-based super alloys. However, it has been demonstrated that using an iron- and nickel-based alloy, essentially free of cobalt is particularly suited to this application. The chemical makeup of a preferred iron- and nickel-based alloy is disclosed in U.S. Pat. Nos. 4,810,464 and 5,332,628, which are incorporated herein by reference. This iron- and nickel-based alloy is used as both the slab contact surface and may be used as the material of construction of the tubular roller body 12. Further this iron- and nickel-based alloy has an established performance history of strength and lubricity at high temperatures and can be an effective replacement for the much heavier super alloy casting.

Referring to FIG. 2, in a preferred embodiment of the present invention, the tubular roller body 12 includes a cylindrical tubular hot shell 18 with a hot shell inner surface 20 and a hot shell outer surface 22. The hot shell outer surface 22 acts as the tubular roller body 12 outer surface, to which the helical-shaped tires 16 are attached. Enclosed substantially within the hot shell 18 is a cylindrical tubular cold shell 24 with a cold shell inner surface 26 and a cold shell outer surface 28. This cold shell 24 extends longitudinally within the hot shell 18 and, in the areas that are not enclosed by the hot shell 18, the cold shell 24 tubular shape tapers at the end.

Captured between the hot shell inner surface 20 and the cold shell outer surface 28 is a plurality of axial composite spacers 30. The axial composite spacers 30 are constructed from refractory composite and serve to transmit compressive loads from the hot shell 18 to the cold shell 24, effectively building a truss between the cold shell 24 and the insulated hot shell 18. Further, these composite spacers 30 will be captured by, but not bonded to, any part of the structure. In this manner an annular air gap 32 is formed between the cold shell 24 and the hot shell 18. It is this annular air gap 32 which will provide most of the insulation between the cold shell 24 and the hot shell 18. The use of air as an insulating medium will result in the lowest possible "k" factor for this area of the roller body 12 and eliminate the expansion and contraction problems associated with the use of refractory bonded to steel structures.

Between each of these composite spacers 30 are spacer tubes 34 which provide axial location for the composite spacers 30. The dimensions of the spacer tubes 34 will be such that they tolerate any differential growth patterns within the high heat gradient zones.

It is envisioned that the cold shell 24 is constructed of carbon steel. The temperature gradient across the cold shell 24 may be on the order of 300° F., with the cold shell inner surface 26 being at or below 200° F. It is also envisioned that the cold shell 24 assembly will be easily reusable, even if the hot shell 18 assembly requires replacement.

Figure 3:
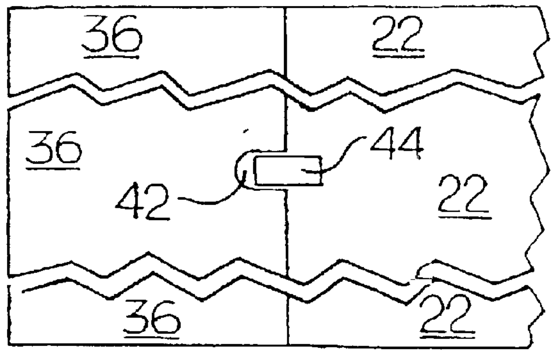
FIG. 3 is a top view of an internally-slotted chill ring with a keyhole and a hot shell with a key of the furnace roller of FIG. 1.
Figure 4:
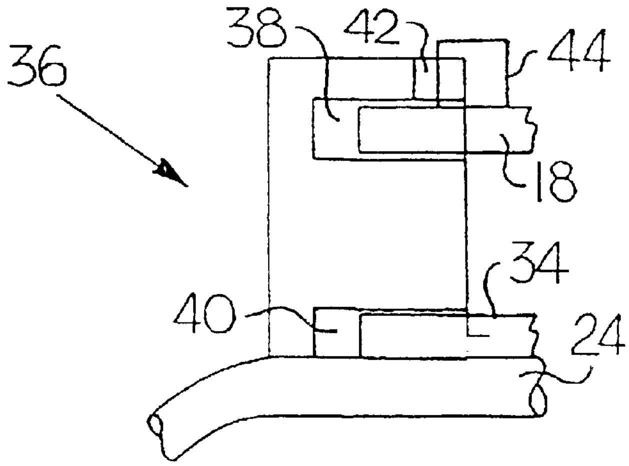
FIG. 4 is a side-sectional view of the internally-slotted chill ring with a keyhole and the hot shell with a key of FIG. 3.

An internally-slotted chill ring 36 is attached to the ends of the cold shell outer surface 28 and extend axially around and outward therefrom. As shown in FIGS. 3 and 4, the chill ring 36 is configured to receive the hot shell 18 into the hot shell chill ring slot 38 and the spacer tube 34 into the spacer tube chill ring slot 40. It is important to note that both the hot shell 18 and the spacer tubes 34 should slide partially, but not completely into, hot shell chill ring slot 38 and spacer tube chill ring slot 40. On the distal and inner area of the chill ring 36 is a chill ring keyhole 42. Further, attached to the hot shell outer surface 22, are a plurality of hot shell keys 44, which mate with the chill ring keyhole 42. This overall chill ring 36 assembly allows for thermal expansion of the hot shell 18, the composite spacers 30, and the spacer tubes 34, with respect to the cold shell 24. Typically, such temperature differentials would cause the hot shell 18 and any associated insulators or refractory to separate and fall away from the cold shell 24, exposing the cold shell 24 to the higher furnace heat. It is this chill ring 36 assembly that allows the high heat areas to expand into their respective slots. Specifically, during expansion, the hot shell 18 will have room for expansion into the hot shell chill ring slot 38, and the spacer tubes 34 will expand into the spacer tube chill ring slots 40. In addition, the use of the hot shell key 44 in conjunction with the chill ring keyhole 42, permits expansion but disallows excess axial movement and wobbling.

Internal to the cold shell 24 is a cylindrical tubular cooling water support tube 46. The cooling water support tube 46 extends longitudinally within the cold shell 24, and a helical-shaped water passage tube 48 is attached between and extending longitudinally along the cooling water support tube 46 and the cold shell inner surface 26. The helical shape of the water passage tube 48 defines a helical-shaped cooling water passage area between the outer surface of the cooling water support tube 46 and the cold shell inner surface 26. Also included is a water feed pipe 50, which is configured to convey cooling water into the cooling water passage between the water passage tube 48.

Attached to each end of the cooling water support tube 46 are water injection tubes 52 having water injection passages 54. In operation, the water feed pipe 50 injects water into the system, the water flowing into the water injection tube 52 through the water injection passage 54 and into cooling water passage defined by the water passage tubes 48. This water distribution circuit forces the cooling water to travel in a spiral path as it traverses the cooling water support tube 46. This balances the effects of one-sided heating, which might occur during line stoppages, and it also removes any air pockets or trapped gases which can develop during operation. The full-length water feed pipe 50 directs cold water through the water passage tube 48 to the opposite end of the roller body 12. The water is then forced back around the spiral passage to the original entry end, and from there, it may be forced back into a rotary reunion distributor.

It is envisioned that bearing structures 56 are attached at either end of roller body 12, facilitating the rotation of the roller body 12. These bearing structures 56 could also be cooled via the cooling water injected from the water feed pipe 50. Finally, the entire roller body 12, is driven by a driver mechanism 58, which is attached to or in communication with at least one end of the roller body 12 and configured to rotate the roller body 12 about the roller longitudinal axis 14.

The present invention 10 will focus the heat and allow the roller body 12 to operate at a slightly lower temperature. In addition, any heat transfer from the heated workpiece or slab to the roller body 12 will not result in concentrated cooling to the helical shape of the tire 16. In addition, the helical shape of the tires 16 will provide continuous shifting of the contact zone between the tires 16 and the slab, reducing the chance of skid marks. Still further this helical shifting contact feature will distribute the adhesive and oxidative interactions over the entire slab area, while still limiting the super alloy thermal exchange at the roller body 12 counterface area.

When the tires 16 are constructed from the aforementioned iron- and nickel-based alloy, the wear resistance of the tires 16 increases dramatically due to the "self-lubricating" tendencies of the boron-rich oxide films developed from the boron carbide constituents in this iron- and nickel-based alloy. The adhesive wear expected at the metallic interface is obviated by the lubricity and durability of the oxide species, which are inherently generated by the this alloy during high temperature contact.

The present invention uses annular air gaps 32 in solving the problems of dissimilar thermal expansion coefficients for surface bonded materials. Also, in using the chill ring 36 assembly, thermal expansion is readily accommodated. Further, the use of this modular, easily replaceable hot shell 18 assembly, together with a permanent, reusable cold shell 24 assembly provides many benefits. The present invention 10 is useable in both tunnel furnace and shuttle furnace applications. Specifically, in shuttle furnace applications, the water cooling features may not be available, however, the helical-shaped tires 16 still provide the same benefit.

Another benefit of the present invention 10, due to the helical shape of the tires 16, is the reduced oxide film or scale growth on the heated workpiece prior to rolling. Typically, this scale must be water blasted prior to rolling. Due to the constantly changing contact points between tires 16 of the present invention 10 and the slab, virtually every area of the underside of the slab is touched at one point. This vastly increased contact point reduces scale in a steel slab emanating from a tunnel furnace that utilizes the present invention 10. It is also envisioned that if the present invention 10 were positioned on top of the steel slab, scale removal would be further enhanced, having a benefit both economically and thermodynamically.

This invention has been described with reference to the preferred embodiments. Obvious modifications and alterations will occur to others upon reading and understanding the preceding detailed description. It is intended that the invention be construed to include all such modifications and alterations.

We claim:

1. A furnace roller for supporting a heated workpiece in a furnace, comprising:
 - a roller body with a roller body outer surface and configured to be rotatable along a roller body longitudinal axis; and
 - at least two helical-shaped tires attached to the roller body outer surface on either side of a roller body bisecting centerline and configured to be rotatable with the roller body, the tires supporting the heated workpiece, and the tires shaped such that a contact interface between the workpiece and the tires continuously shifts in a longitudinal direction.

2. The furnace roller of claim 1, further comprising:
 - a driver mechanism in communication with at least one end of the roller and configured to rotate the roller about the roller longitudinal axis.

3. The furnace roller of claim 1, wherein the tire is constructed from one of a nickel-based alloy, a cobalt-based alloy and an iron- and nickel-based alloy essentially free of cobalt.

4. The furnace roller of claim 1, wherein the roller body outer surface is constructed from one of a nickel-based alloy, a cobalt-based alloy and an iron- and nickel-based alloy essentially free of cobalt.

5. The furnace roller of claim 1, wherein the roller further comprises:
 - a hot shell with an inner surface and an outer surface, the hot shell outer surface acting as the roller outer surface; and
 - a cold shell with an inner surface and an outer surface, the cold shell extending longitudinally along and substantially within the hot shell.

6. The furnace roller of claim 5, further comprising:
 - an internally-slotted chill ring having an inside area with a keyhole, the chill ring attached to at least one end of and extending axially around and outward from the outer surface of the cold shell;
 - wherein at least one end of the hot shell is configured to slide partially into the chill ring slot, the hot shell further including a key attached to at least one end of the hot shell and extending outward therefrom, and
 - wherein, in high heat conditions, the hot shell expands into the chill ring slot, the hot shell key entering the chill ring keyhole.

7. The furnace roller of claim 5, further comprising:
 - at least one axial composite spacer captured between the outer surface of the cold shell and the inner surface of the hot shell;
 - wherein an annular air gap is formed between the cold shell and the hot shell.

8. The furnace roller of claim 7, wherein the at least one composite spacer is longitudinally positioned between the outer surface of the cold shell and the inner surface of the hot shell by at lest one spacer tube.

9. The furnace roller of claim 5, further comprising:
 - a cooling water support tube with an outer surface and extending longitudinally within the cold shell; and a helical-shaped water passage tube attached between and extending longitudinally along the outer surface of the cooling water support tube and the inner surface of the cold shell, thereby defining a helical-shaped cooling water passage between the outer surface of the cooling water support tube and the inner surface of the cold shell.

10. The furnace roller of claim 9, further comprising:

a water injection tube having water injection passages, the water injection tube attached to at least one end of the cold shell and configured to regulate cooling water flow through the water injection passages and the cooling water passage.

11. The furnace roller of claim 9, further comprising:

a water feed pipe configured to convey cooling water into the cooling water passage.

12. A method of conveying a heated workpiece in a furnace, comprising the steps of:

providing a plurality of roller bodies, each roller body having a roller body outer surface and configured to be rotatable along a roller body longitudinal axis;

attaching at least two helical-shaped tires to the roller body outer surface on either side of a roller body bisecting centerline, with the tires rotatable with the roller body and supporting the heated workpiece;

inserting a flat, heated workpiece into a furnace opening; and conveying the flat, heated workpiece over the plurality of roller bodies, the tires supporting the heated workpiece during conveyance, such that a contact interface between the workpiece and the tire continuously shifts in a longitudinal direction.

13. The method of claim 12, further comprising the step of: driving at least one end of the roller body, such that the roller body rotates about the roller body longitudinal axis.

14. The method of claim 12, further comprising the step of:

forming an annular air gap between the cold shell and hot shell.

15. The method of claim 14, further comprising the step of:

positioning at least one axial composite spacer longitudinally between the outer surface of the cold shell and the inner surface of the hot shell.

16. The method of claim 12, wherein the roller further comprises:

a hot shell with an inner surface and an outer surface, the hot shell outer surface acting as the roller outer surface; and a cold shell with an inner surface and an outer surface, the cold shell extending longitudinally along and substantially within the hot shell.

17. The method of claim 16, further comprising the step of:

providing an expansion assembly such that, in high heat conditions, secure hot shell expansion is allowed.

18. The method of claim 16, further comprising the step of:

defining a cooling water passage between the outer surface of a cooling water support tube and the inner surface of the cold shell.

19. The method of claim 18, further comprising the step of:

injecting cooling water into the cooling water passage.

20. The method of claim 18, further comprising the step of:

regulating the flow of cooling water through the cooling water passage.

* * * * *